(12) United States Patent
Deiss et al.

(10) Patent No.: US 12,286,309 B2
(45) Date of Patent: Apr. 29, 2025

(54) DEVICE FOR TURNING PANELS

(71) Applicant: GRENZEBACH BSH GmbH, Bad Hersfeld (DE)

(72) Inventors: Claus Deiss, Bad Hersfeld (DE); Olek Ernst, Hauneck-Unterhaun (DE); Bernd Fuchs, Bad Hersfeld (DE)

(73) Assignee: GRENZEBACH BSH GmbH, Bad Hersfeld (DE)

( * ) Notice: Subject to any disclaimer, the term of this patent is extended or adjusted under 35 U.S.C. 154(b) by 7 days.

(21) Appl. No.: 18/035,379

(22) PCT Filed: Nov. 4, 2021

(86) PCT No.: PCT/EP2021/025429
§ 371 (c)(1),
(2) Date: May 4, 2023

(87) PCT Pub. No.: WO2022/096150
PCT Pub. Date: May 12, 2022

(65) Prior Publication Data
US 2024/0002166 A1 Jan. 4, 2024

(30) Foreign Application Priority Data
Nov. 5, 2020 (DE) .................... 10 2020 006 799.9

(51) Int. Cl.
*B65G 47/24* (2006.01)
*B21D 43/14* (2006.01)
*B65G 47/252* (2006.01)

(52) U.S. Cl.
CPC ......... *B65G 47/252* (2013.01); *B21D 43/145* (2013.01); *B65G 2201/022* (2013.01)

(58) Field of Classification Search
CPC ..... B65G 47/24; B65G 47/252; B21D 43/145
USPC .................................. 198/402; 414/758, 767
See application file for complete search history.

(56) References Cited

U.S. PATENT DOCUMENTS

| | | | |
|---|---|---|---|
| 3,552,538 A | 1/1971 | Triggs et al. | |
| 4,124,126 A * | 11/1978 | Abraham | B22C 17/08 414/742 |
| 4,484,675 A * | 11/1984 | Doherty | B65G 47/248 198/403 |
| 4,523,670 A * | 6/1985 | Yanagisawa | B65G 47/252 414/758 |
| 4,798,278 A * | 1/1989 | Cornacchia | B65G 47/252 414/773 |
| 4,947,981 A * | 8/1990 | Dorner | B65G 47/252 198/463.3 |

(Continued)

FOREIGN PATENT DOCUMENTS

| | | |
|---|---|---|
| DE | 1 958 785 U | 4/1967 |
| DE | 17 56 461 A1 | 4/1970 |

(Continued)

OTHER PUBLICATIONS

Jan. 28, 2022 International Search Report issued in International Patent Application No. PCT/EP2021/025429.

*Primary Examiner* — Douglas A Hess
(74) *Attorney, Agent, or Firm* — Oliff PLC (57) ABSTRACT

A device for transporting panels resting upon a conveyor belt and for turning panels by means of a turning device, characterized in that the turning device has a turning arm which performs both a rotary and a transverse movement for turning the panels.

17 Claims, 8 Drawing Sheets

(56) References Cited

U.S. PATENT DOCUMENTS

| | | | | |
|---|---|---|---|---|
| 5,605,216 | A * | 2/1997 | Raybon | B27B 31/04 |
| | | | | 198/395 |
| 5,738,483 | A * | 4/1998 | Terpstra | B23Q 1/4866 |
| | | | | 414/758 |
| 6,598,760 | B1 * | 7/2003 | Wilson | A47F 1/08 |
| | | | | 312/45 |
| 6,793,454 | B2 * | 9/2004 | Brizzi | B65H 15/02 |
| | | | | 414/766 |
| 7,153,086 | B2 * | 12/2006 | Kauppila | B65G 47/252 |
| | | | | 198/402 |
| 8,439,625 | B2 * | 5/2013 | Pass | B21B 39/32 |
| | | | | 414/771 |
| 10,239,703 | B2 * | 3/2019 | Staal | B65G 19/265 |
| 2005/0150743 | A1 * | 7/2005 | Henderson | |

FOREIGN PATENT DOCUMENTS

| | | |
|---|---|---|
| DE | 25 50 321 A1 | 5/1977 |
| JP | S63-157436 U | 10/1988 |
| WO | WO-2020014790 A1 * 1/2020 | ............. B65G 43/08 |

* cited by examiner

DEVICE FOR TURNING PANELS

The invention relates to a device for transporting panels lying on a conveyor belt and for turning the panels by means of a turning device according to the preamble of patent claim 1.

DE 1 958 785 U already discloses such a device, referred to there as a plate turner, to which the plates are fed via a cylinder conveyor or roller conveyor.

The plate turner has turning arms arranged in a star shape and picks up the plates from the roller conveyor.

Clamping devices for clamping and holding the panels on the turning arms are also provided between the turning arms. The plate turner is then turned until the previously lower side of the respective clamped plate is on top. With the plate in this position, the clamping devices are released. The slab is picked up by another roller conveyor, which is now located below it, and passed on this, so that the next slab can be placed on the surface freed up by that slab.

The known star-shaped turning device has the disadvantage that a longitudinal movement of the panels to be turned on the roller conveyor is abruptly decelerated and the panels are subjected to a rotational acceleration from the decelerated horizontal movement. From that decelerated horizontal movement, after the turning process has been completed during a rotation of about 180°, they are decelerated again to a rotation speed of zero and again, they are accelerated in the horizontal direction, i. e. in the direction of the roller conveyor, In the case of the known turning device, the speed of the turning process is therefore limited, since otherwise the edges of the panels in particular would be damaged by the changing accelerations and speeds. The surfaces with which the panels rest on the roller conveyor and the turning arms of the turning device could also be damaged.

It is the object of the invention to create a turning device which carries out a transition from the conveyor belt to the turning device and from the turning device to the conveyor belt without strong decelerations and accelerations.

The object is resolved as specified in patent claim 1.

Because the turning device according to the invention has a turning arm, which performs both a rotary and a transverse movement to turn the panels, the panels moved transversely by the conveyor belt are picked up by the turning arm by a pushing movement and gradually decelerated from the transverse movement and then subjected to a small rotational acceleration due to a gradual pivoting movement. This ensures a smooth turning process without the risk of damage to the plates.

Advantageous embodiments of the invention result from the dependent claims, from the description and from the drawings, in particular in connection with the associated description.

Of particular advantage is the use of a control device for coordinating the rotary and transverse movements of the turning arm.

The movement of the panels picked up by the turning device with respect to the conveyor belt from which the turning device picks up the plates is coordinated by the control device. Thereby, as the turner picks up the plates moving at the speed of the conveyor, they will slow down and then gradually accelerate to a rotational acceleration to turn the plate picked up by the turner and then place it back onto the conveyor without damaging the plate.

The invention makes it possible to deposit the panel precisely at a designated location on the conveyor belt, in particular on a panel lying on the conveyor belt that had not previously been fed to the turning device, i. e., left unturned on the conveyor belt. In this way, pairs of stacked boards are formed from a stream of boards lying on the conveyor belt with an A side and a B side, the A sides of which face each other in the stacked state.

Therefore, the turning device according to the invention is suitable for all types of panels whose A-sides and B-sides are different from each other, such as building material panels, plasterboard, veneer panels and glass panels.

The control device advantageously has mechanical and/or electronic means. Since transverse and rotational movement overlap each other undisturbed when the plates are turned, it is possible to use both types of movements by separate drive means, e.g. H. To control engines, especially in connection with transmissions. The transverse movement can also be broken down into a movement component parallel to the movement of the conveyor belt and a movement component perpendicular to the movement of the conveyor belt. The vertical component of movement is required to lift the panels to be turned so that they can be placed on top of non-turned panels. The invention enables precise setting of the placement position of the turned panels, which can also slip out of the turning device down, for example.

In the case of an electronic control, the height of the turning device can also be easily adjusted, which in this way can be adapted to different thicknesses of panels.

Likewise, the speed of the turning process must also be adjusted depending on the conveying speed of the panels, their relative distance on the conveyor belt and the length of the panel.

For example, a particularly simple and flexible solution for the turning process can be implemented if a single motor is used for each movement component (two transverse movements and one rotary movement), which motor is controlled independently of the other motors.

If mechanical components are used instead of a purely electronic control with three motors, or if mechanical control takes place only partially or during certain periods of time within a movement cycle to carry out a turning process, the control device preferably comprises a push rod which acts on an eccentric via a first rotary joint, which in turn is articulated to a second swivel joint via which the turning arm can be rotated.

Advantageously, it is additionally provided that the turning arm can be driven via a chain or belt drive to generate the transverse movement.

In a further advantageous embodiment it is provided that the turning arm for generating the transverse movement can be guided over a straight or curved contour, along a cam disk or through a cam mechanism.

An electronic controller preferably has at least a first motor for generating a transverse movement of the turning arm in at least one spatial direction and a second motor for generating a rotary movement of the turning arm.

It proves to be particularly advantageous if the movement of the panels turned by the turning device can be synchronized with the movement of the conveyor belt.

The plates are preferably divided into first and second plates lying one after the other on the conveyor belt, so that the first plates are gripped by the turning arm and turned over on the conveyor belt or placed on the second plates or deposited between them. This requires the turning process to be synchronized with the conveying speed of the conveyor belt.

According to the invention, a simple design of the turning device is provided; this includes a turning arm with a first and a second legs which are connected to one another at the ends and between which one of the plates is received by being pushed onto the first leg.

It is preferably provided according to the invention that the first plate is held between the legs by the transverse movement and the rotary movement of the turning arm in such a way that it executes a rotary movement in relation to the conveyor belt.

In this case, the first panel is advantageously turned in such a way that it is placed on the second panel after the turning process has been completed. This means that the first plate only performs a rotary movement and no transverse movement relative to the conveyor belt. Compared to the second plate, it is only shifted upwards by its height.

In another, alternative embodiment, it is also possible to use the gravity of the plate when performing the turning process, as a result of which a first plate can be pivoted between the two legs during the rotary movement of the turning arm, whereby it is placed from the first leg onto the second leg, so that it is finally placed on a second plate or on the conveyor belt itself after the rotary and transverse movement of the turning arm has been completed by sliding out from the second leg of the turning arm.

A further advantage of the invention is that the turning arm is rotatably mounted on a first swivel joint at an outer end of the second leg and that the turning arm can be swiveled via the swivel joint while at the same time performing a transverse movement.

Preferably, the transverse and rotational movements of the turning arm are synchronized with the transverse movement of the conveyor belt, because the turning of a panel corresponds simultaneously to a transverse movement of the panel towards the conveyor belt by the length of the panel in the conveying direction.

In one embodiment of the invention, panels that have been turned by the turning device are turned in such a way that they come to rest on plates that are not turned and are lying on the conveyor belt. During this turning process, the turned panel essentially only performs a rotary movement around its rear edge resting on the conveyor belt and is lifted slightly by the height of the panel that has remained lying on the conveyor belt in order to be placed on it by the turning device.

According to the invention, by using the turning device in cooperation with the connecting rod, a transversal displacement of the turned panels in relation to their position on the conveyor belt is possible.

The turning arm according to the invention is shaped in such a way that it can be used for a large number of plate formats, ie. i. e., of panel widths.

The panels are turned over their broad side, which has a width of 600 mm to 1400 mm, for example. Plates of this type can be turned with the same turning device with the same turning arms, without the turning device having to be rebuilt or downtimes having to be accepted, as is the case with conventional turning arms.

This advantage of the turning arms results from the fact that the first leg onto which the plate is pushed is at least half as long as the second leg. It is particularly advantageous if the first leg has a length of up to three quarters of the length of the second leg. So that the panels to be turned can easily slide onto the first leg, this is preferably equipped with rollers as supports for the panels. In addition, the first plates may also have sliding strips made of a rubber material.

The invention is explained in more detail in an exemplary embodiment with reference to the drawings. The drawings show.

Panels 2, 3 are transported in the direction of an arrow A on a driven conveyor belt 1 (FIGS. 1 to 6) equipped with a plurality of partial belts arranged next to one another in the conveying direction. For manufacturing reasons, the panels 2, 3 are in pairs one behind the other on the conveyor belt 1.

The conveyor belt 1 consists of a plurality of spaced-apart parallel individual belts. A partial turning device of a turning device 4 is arranged in each case in the free spaces between the bands. There are at least two part-turning devices available to take the panels 2. According to the width of the panel of the panels 2, the partial turning devices can be arranged at different positions between the individual bands of the conveyor belt 1. Preferably, the distance between the partial turning devices can also be changed. In particular, the partial turning devices can be attached between different belts of the conveyor belt 1.

It is provided that only the panels 2 are to be turned by the turning device 4 while the panels 3 remain in their positions on the conveyor belt 1.

Figure 7:
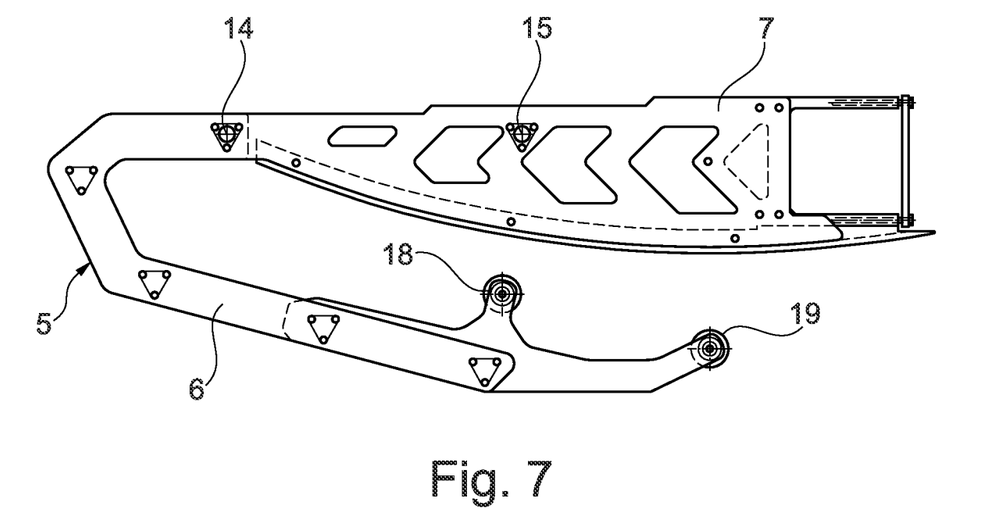
Figure 8:
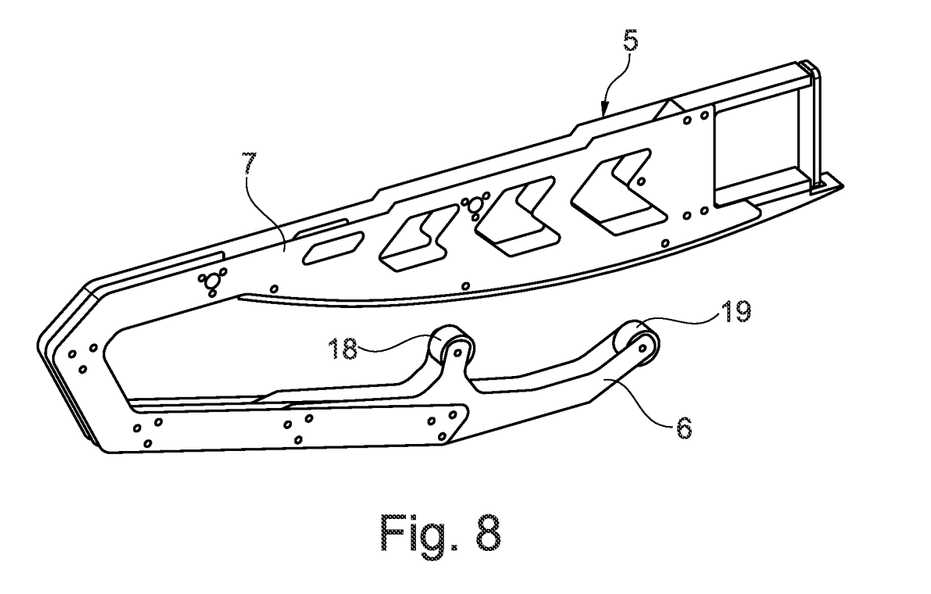
FIG. 8 shows the turning arm according to FIG. 7 in an isometric view and FIG. 9 shows a turning device in an isometric view.

The turning device 4 comprises a turning arm 5, which in turn has two legs 6, 7 (FIG. 7, 8).

The leg 6 lying underneath in the receiving position (FIG. 1) is moved slightly upwards with its front edge by the rotary movement of the turning device 4 about a rotary joint 8 arranged in a position to be variable, so that the panel 2 can slide with its front edge onto the leg 6, being pushed onto the leg 6 by the conveyor belt 1. The leg 6 is provided with a coating on its surface, so that the panel 2 is slowed down sufficiently and does not impact in a region 9 where the two legs 6, 7 are connected to one another.

Then the panel 2 is raised by the further rotation of the turning device 4 in the direction of a rotary arrow B about the pivot 8 from its front edge (FIG. 2), so that it slides between the two legs 6, 7 upwards, while the rear Edge of the panel 2 preferably rests against the front edge of the panel 3.

Figure 1:
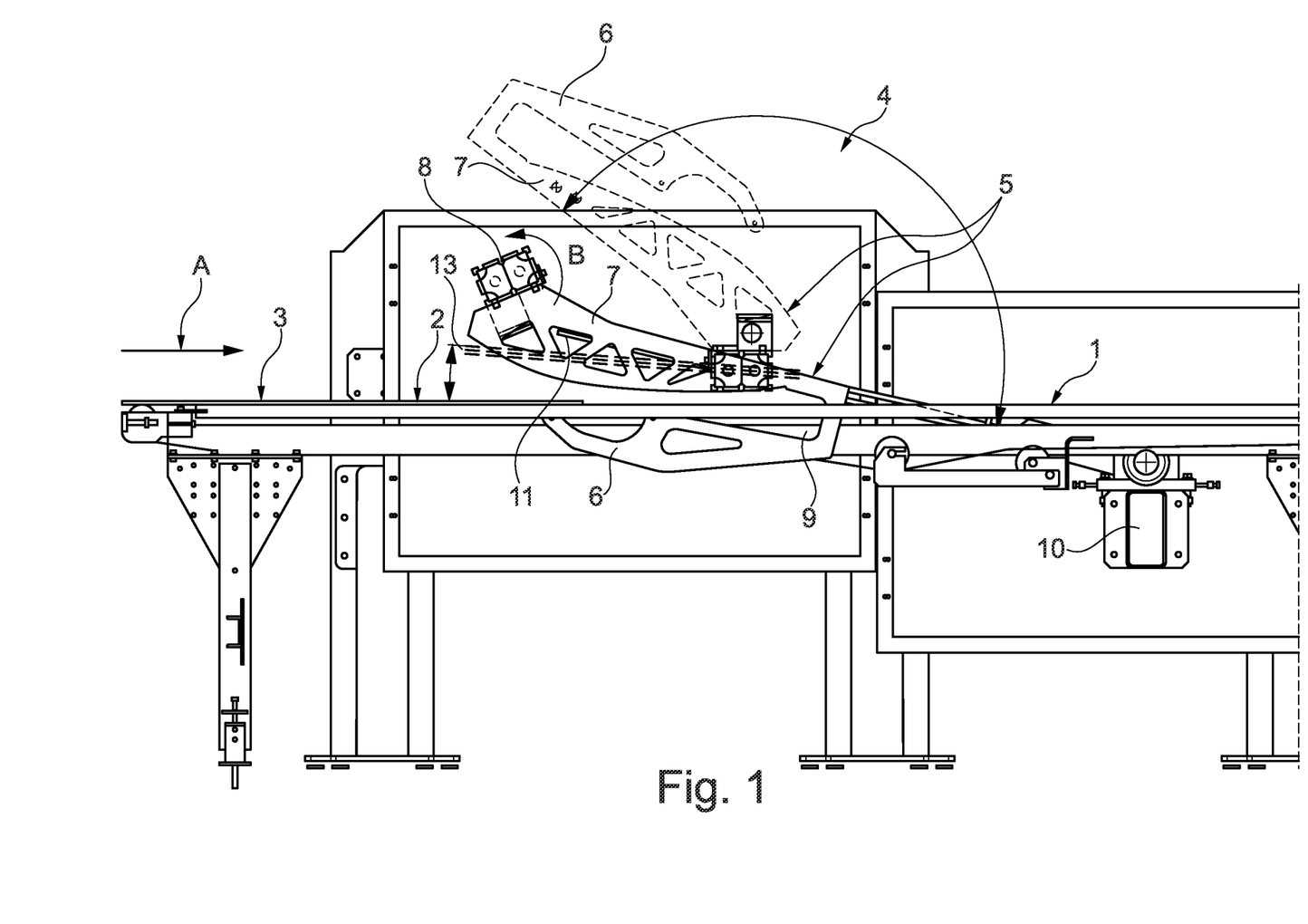
FIGS. 1 to 6 a side view of a turning device arranged above a conveyor belt for turning panels lying on the conveyor belt, FIG. 7 a turning arm in a side view.
Figure 2:
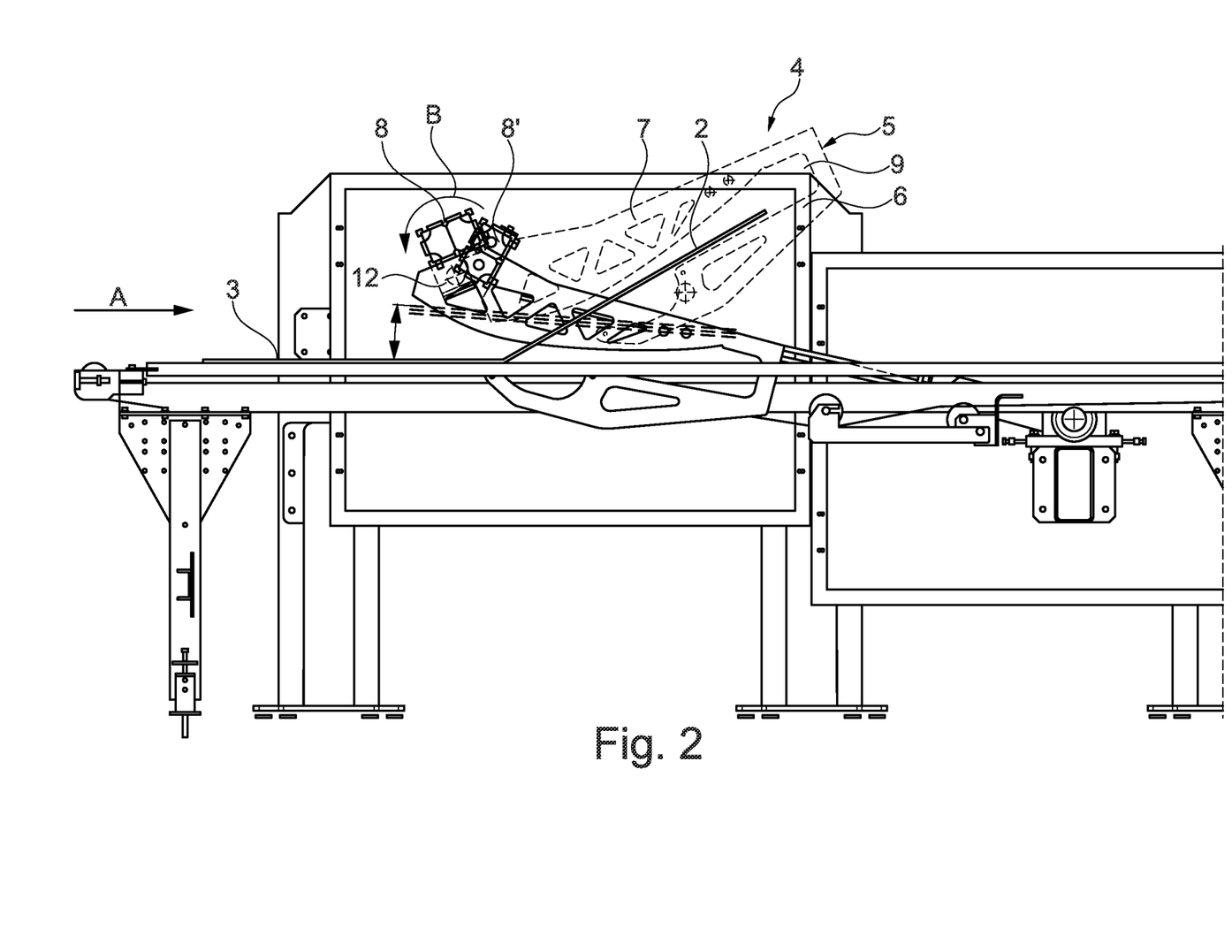
Figure 3:
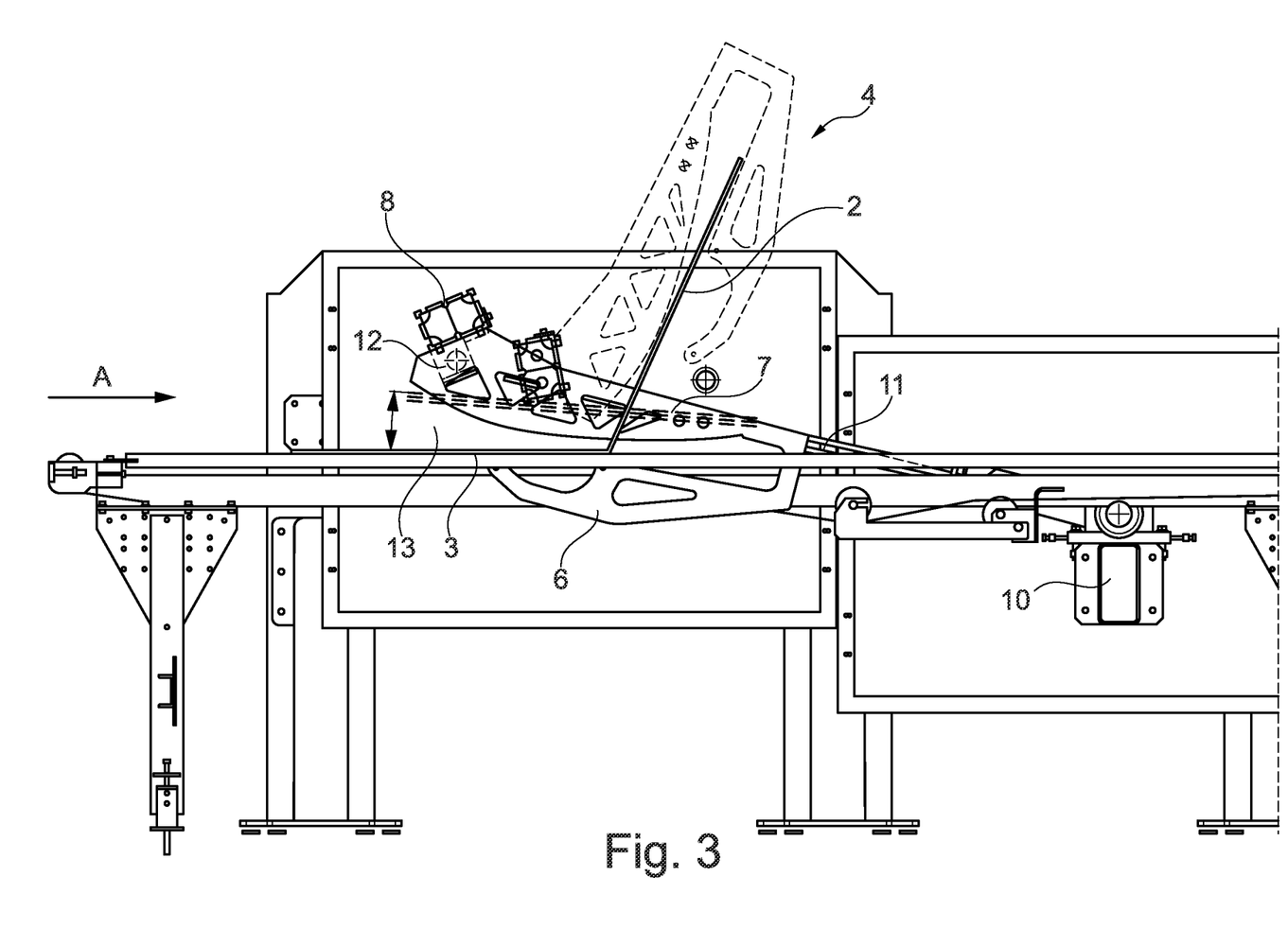

The rotary movement of the turning device 4 is brought about by a drive 10 which drives a connecting rod 11 which, via an eccentric 12, causes the rotary joint 8 to rotate so that it reaches the position 8' (FIG. 2). At the same time, the turning device 4 performs a transverse movement. Here, the transverse movement is limited by a frame 13. The frame 13 is adapted to the dimensions of the panels 2; In addition, a chain drive or another drive is preferably present to implement the transverse portion of the turning device 4. The movement of the turning device is preferably limited by a contour attached to the frame 13, for example a curved contour, or by a cam disk.

The panel 2 is pushed upwards by the rotary movement of the pivot 8 and moves towards the area 9 (FIGS. 3, 4) while continuing to rest on the conveyor belt 1 with its rear edge.

Figure 4:
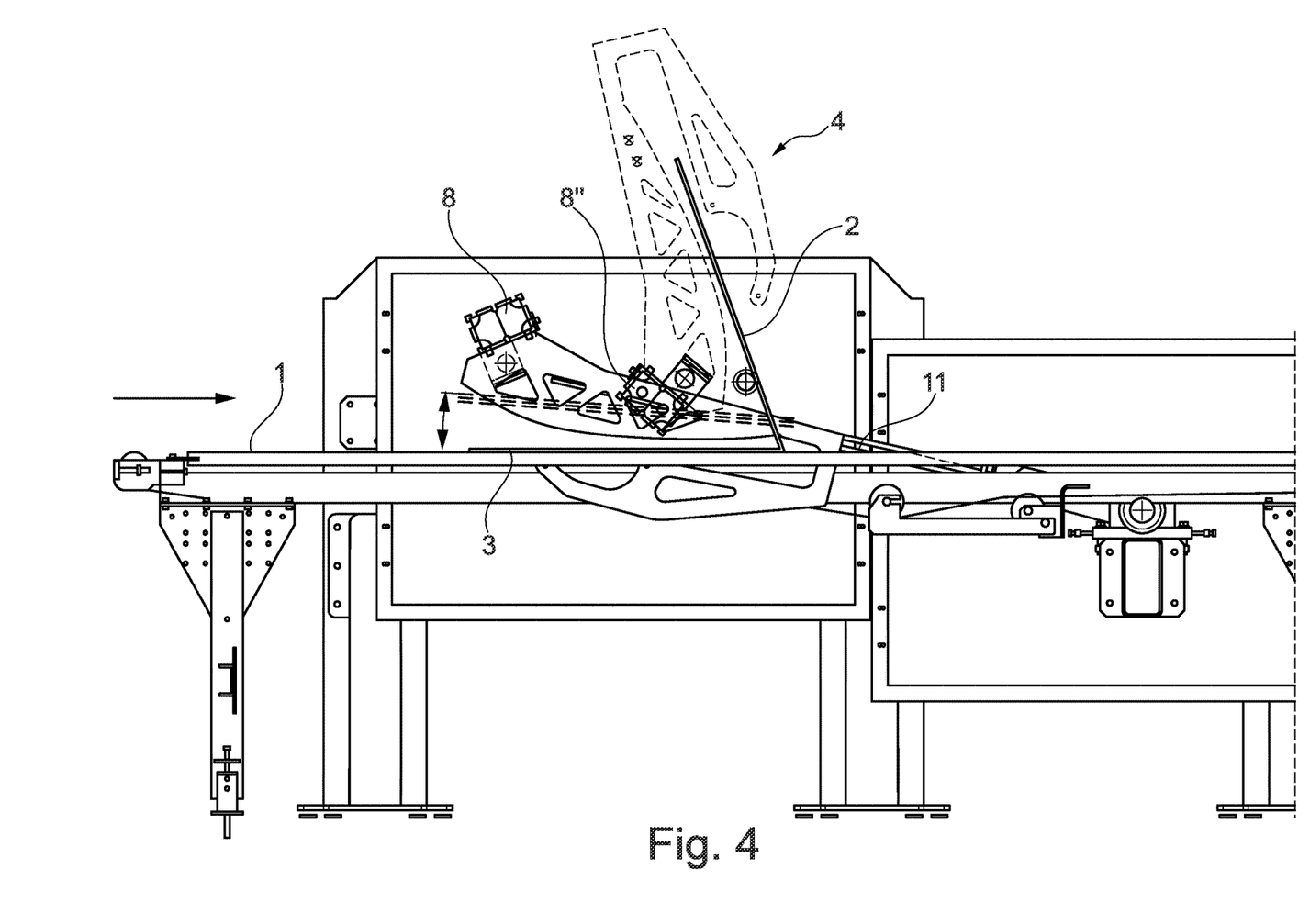

The retraction movement of the connecting rod 11 shifts the pivot point of the turning device 4 to a position 8", while the panel 2 is set up between the legs 6, 7 (FIG. 4).

Figure 5:
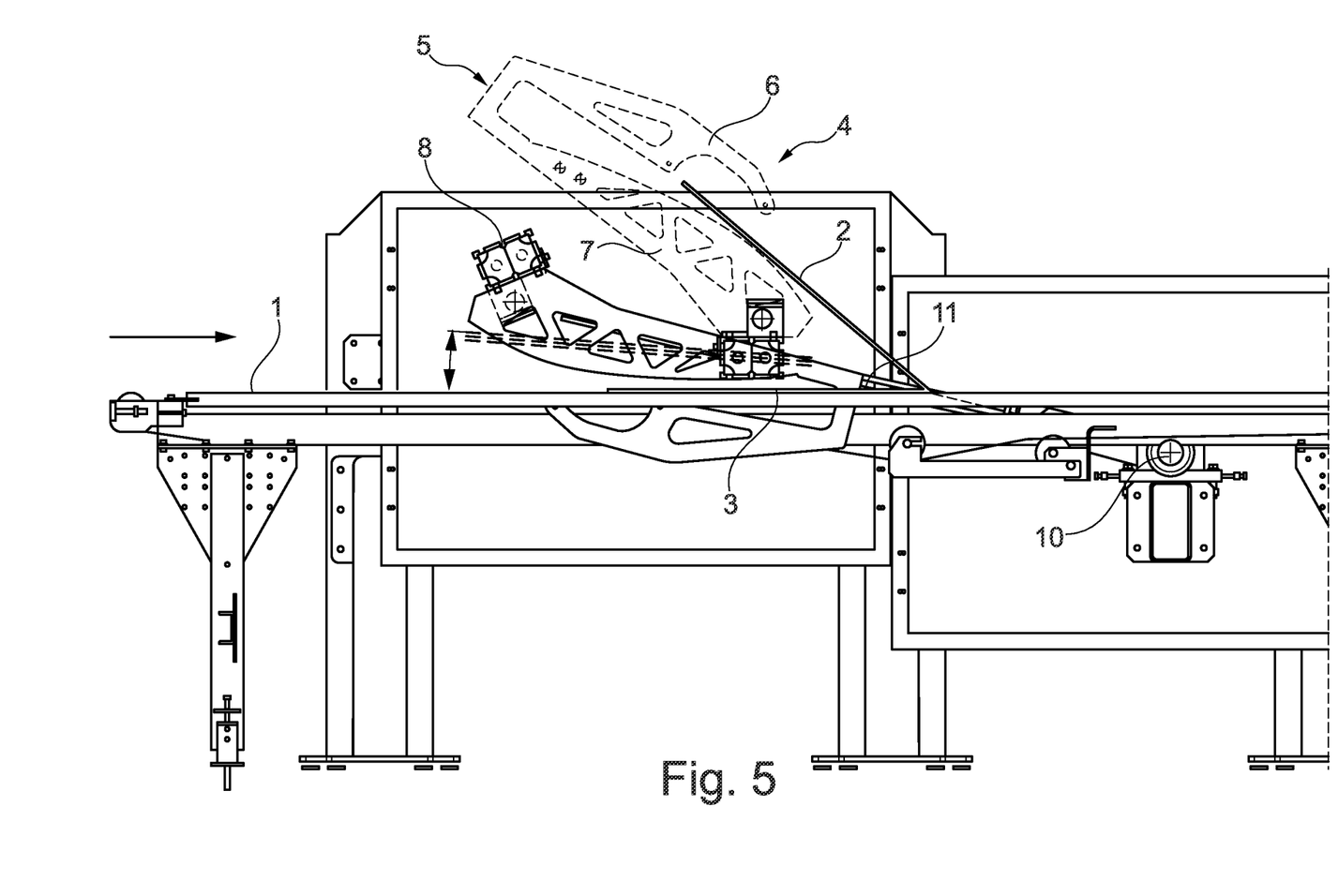
Figure 6:
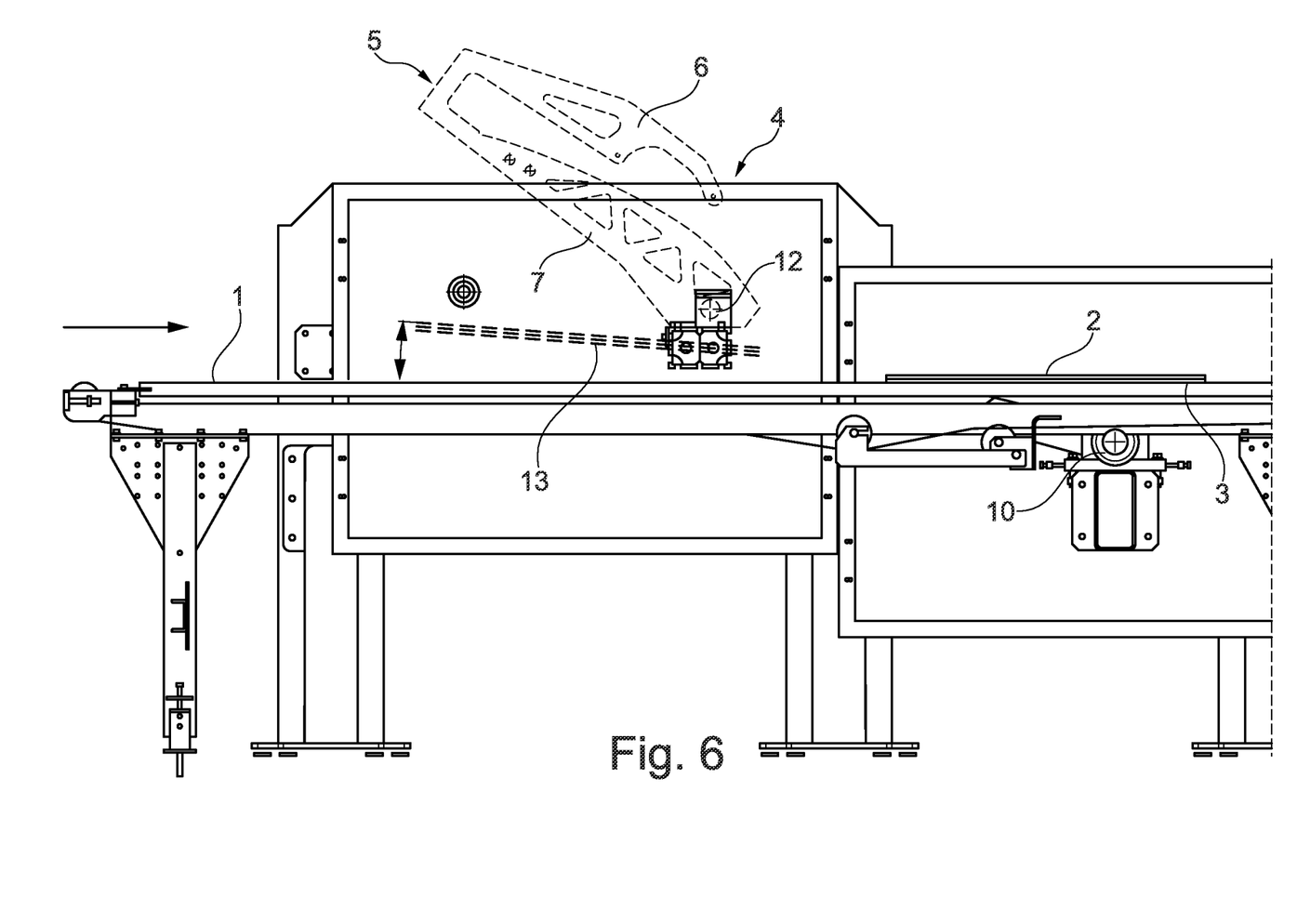

By turning the turning device 4 further, the panel 2 is placed on the panel 3 (FIGS. 5, 6). Then by the movement of the connecting rod 11 a reverse movement of the turning device 4 completed, so that it returns to its original position and is ready to receive another panel 2.

Figure 9:
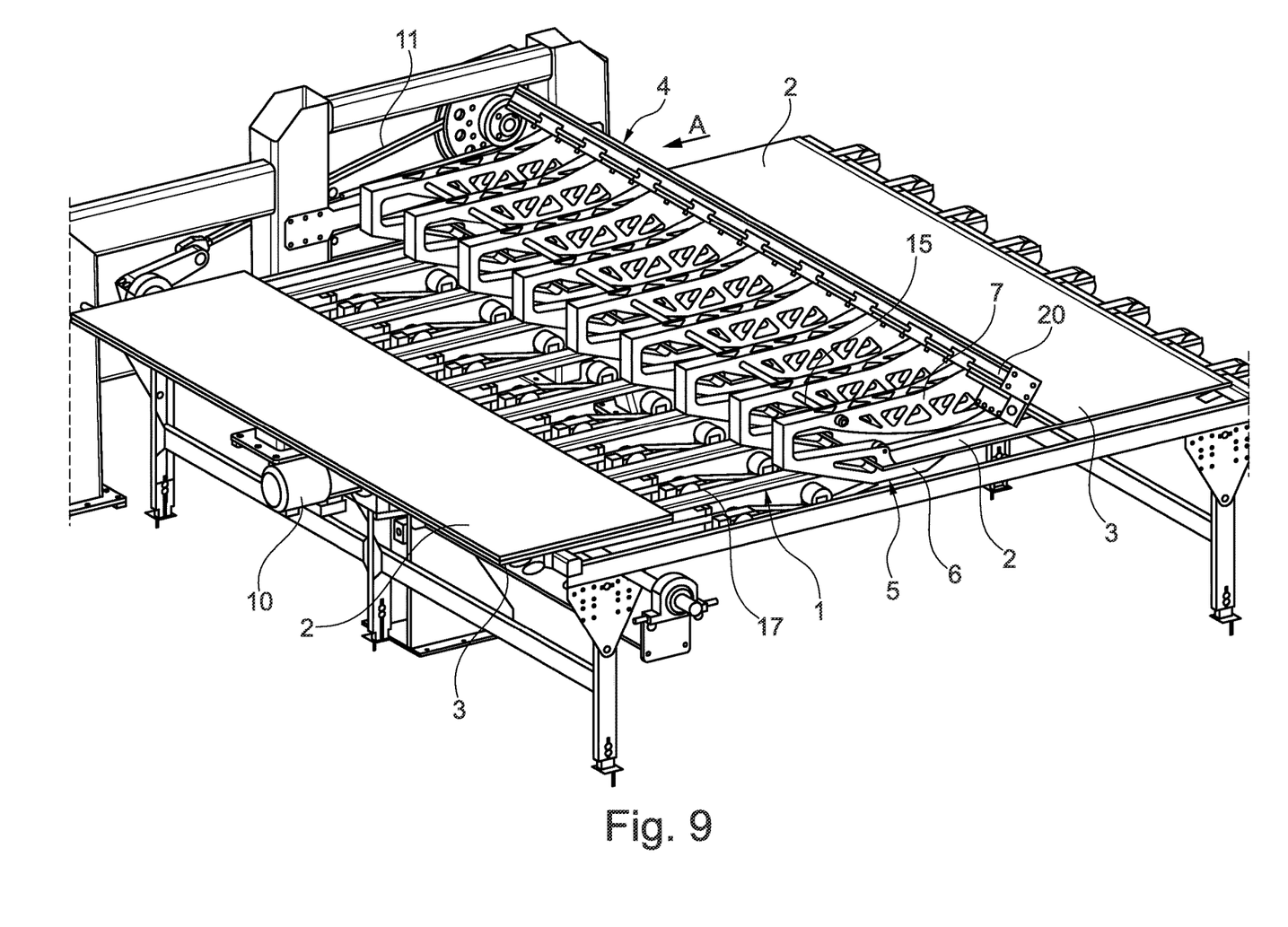

The turning arm 5 has at least one continuous bore 14 (FIGS. 7, 8) or an additional second bore 15, so that all turning arms 5 of the turning device 4 are connected to one another by a connecting rod 15 (FIG. 9). The turning arms 5 are mounted in a frame 20 and can, if required, be arranged at different distances from one another in the frame 20, for example shifted relative to one another. Because the distances between the turning arms 5 are variable, the turning device 4 can be easily installed on different conveyor devices and can be adapted to different distances between belts 17 of the conveyor belt 1.

The panels 2 are transported via the conveyor belt 1 to the turning arms 5 of the turning device 4, so that the panels 2 can be picked up between the legs 6 and 7 of the turning arms 5 as soon as the turning arms 5 are brought into the pick-up position by the drive 10 via the connecting rod 11. In this way, panels 2, 3 arranged one after the other in the direction of the arrow A are superimposed by the front panel 2 being placed on the subsequent panel 3 by the turning device 4 by the turning operation.

Sliding the panels 2 onto the leg 6 is preferably facilitated by the fact that the leg carries rollers 18, 19 on its upper side. Alternatively, for example, runners made of a material with low sliding friction are provided on the leg 6.

The invention thus creates a machine for continuously turning panels of building material.

The invention claimed is:

1. Device for transporting panels lying on a conveyor belt, comprising:
   the conveyor belt; and
   a turning device configured to turn the panels,
   wherein the turning device has a turning arm which, for turning the panels takes both a rotary and a transverse movement, and
   wherein the turning arm comprises legs including only a first leg and a second leg, the first leg and the second leg directly connected to each other at ends and between which one of the panels is configured to be held by sliding the one of the panels onto the first leg without sliding the one of the panels onto the second leg, the first leg and the second leg having fixed positions relative to each other.

2. The device according to claim 1, further comprising a control device for coordinating the rotary and transverse movements of the turning arm.

3. The device according to claim 2, wherein the control device comprises mechanical and/or electronic means.

4. The device according to claim 2, wherein the control device comprises a push rod or a crank rod which acts via a first pivot on an eccentric which in turn is articulated on a second pivot via which the turning arm is rotatable.

5. The device according to claim 2, wherein the turning arm is configured to be driven via a chain or belt drive to generate the transverse movement.

6. The device according to claim 2, wherein the turning arm is configured to be guided over a straight or curved contour, along a cam disc or by a cam mechanism to generate the transverse movement.

7. The device according to claim 2, wherein the control device comprises at least a first motor for generating a transverse movement of the turning arm in at least one spatial direction and a second motor for generating a rotary movement of the turning arm.

8. The device according to claim 1, wherein the movement of the panels turned by the turning device can be synchronized with the movement of the conveyor belt.

9. The device according to claim 8, wherein the panels are divided into first and second panels lying one after the other on the conveyor belt, wherein the first panels can be detected by the turning arm and placed turned on the conveyor belt or on the second panels.

10. The device according to claim 1, wherein the first panel is held between the legs by the transverse movement and the rotary movement of the turning arm in such a way that it executes a rotary movement in relation to the conveyor belt.

11. The device according to claim 10, wherein the first panel is turned over in such a way that it is placed on the second panel after the turning process has been completed.

12. The device according to claim 10, wherein the turning arm is rotatably mounted at an outer end of the second leg on a first pivot joint and that the turning arm can be pivoted via the pivot joint while at the same time making a transverse movement completes.

13. The device according to claim 1, wherein the first panel can be pivoted by gravity between the two legs during the rotary movement of the turning arm, can be placed from the first leg onto the second leg and after the rotation has been completed, and transverse movement of the turning arm can be placed on the second panel by sliding out from the second leg of the turning arm.

14. The device according to claim 1, wherein the transverse and the rotary movement of the turning arm are synchronized with the transverse movement of the conveyor belt.

15. The device according to claim 1, wherein the first leg is at least half as long as the second leg.

16. The device according to claim 15, wherein the first leg has a length of up to three quarters of the length of the second leg.

17. The device according to claim 1, wherein the first leg has rollers as supports for the panels.

* * * * *